US008333925B2

(12) United States Patent
Holmes et al.

(10) Patent No.: US 8,333,925 B2
(45) Date of Patent: Dec. 18, 2012

(54) ERGONOMIC PIPETTING WORKSTATION

(76) Inventors: Jeffrey Michael Holmes, Bellingham, WA (US); Mickey Blake, Bellingham, WA (US); Peter Joseph Kegel, Bellingham, WA (US)

( * ) Notice: Subject to any disclaimer, the term of this patent is extended or adjusted under 35 U.S.C. 154(b) by 180 days.

(21) Appl. No.: 12/802,161

(22) Filed: Jun. 1, 2010

(65) Prior Publication Data

US 2010/0310427 A1 Dec. 9, 2010

Related U.S. Application Data

(60) Provisional application No. 61/217,914, filed on Jun. 5, 2009.

(51) Int. Cl.

*G01N 21/00* (2006.01)
*B01L 3/00* (2006.01)
*B01L 9/00* (2006.01)

(52) U.S. Cl. ......... 422/63; 422/65; 422/82.05; 422/500; 422/551; 422/552; 422/553; 422/560; 422/561

(58) Field of Classification Search .......... 422/500–503, 422/509, 526, 547, 549, 551, 560–562, 564, 422/62–68.1, 82.05
See application file for complete search history.

(56) References Cited

U.S. PATENT DOCUMENTS

| | | | | | |
|---|---|---|---|---|---|
| 4,700,640 | A * | 10/1987 | Andersson | 111/186 |
| 5,042,672 | A * | 8/1991 | Mehlin et al. | 211/42 |
| 5,061,449 | A * | 10/1991 | Torti et al. | 422/525 |
| 5,094,350 | A * | 3/1992 | Smock | 211/59.2 |
| 5,620,894 | A * | 4/1997 | Barger et al. | 435/286.2 |
| 6,235,245 | B1 * | 5/2001 | Sherman et al. | 422/562 |
| 6,379,565 | B1 * | 4/2002 | Guirguis et al. | 210/767 |
| 6,615,841 | B2 * | 9/2003 | DeLoach | 131/329 |
| 6,887,431 | B1 * | 5/2005 | Vann et al. | 506/43 |
| 7,553,451 | B2 * | 6/2009 | Fichera | 422/63 |
| 7,846,315 | B2 * | 12/2010 | Amirkhanian et al. | 204/604 |
| 2004/0083830 | A1 * | 5/2004 | Nashiki et al. | 73/865.9 |
| 2006/0237608 | A1 * | 10/2006 | Hanson et al. | 248/276.1 |

* cited by examiner

*Primary Examiner* — Brian R Gordon
(74) *Attorney, Agent, or Firm* — Pierce V. Keating

(57) ABSTRACT

A workstation for pipetting provides for an ergonomic pipetting environment. Test tubes, centrifuge tubes, micro tubes and micro plates are inserted into a top plate, which is designed to hold such devices in a desired configuration. The top plate is adjustable with respect to height and planar angle, so that extensive pipetting efforts are less likely to result in repetitive stress related injuries.

3 Claims, 4 Drawing Sheets

ERGONOMIC PIPETTING WORKSTATION

CROSS REFERENCE TO OTHER APPLICATIONS

This application claims priority to Provisional U.S. Patent Application No. 61/217,914, entitled Ergonomic Pipetting Workstation, filed Jun. 5, 2009, which is incorporated herein by reference.

FIELD OF INVENTION

This invention relates to a laboratory workstation for test tubes and micro plates to provide an ergonomic work environment for the pipetting of liquids.

BACKGROUND OF THE INVENTION

Pipetting is a technique commonly employed within medical, biotechnology and life science laboratories to transfer a precise volume of liquid from a source reservoir to a target reservoir. A pipette typically uses a controlled vacuum to draw a liquid into its tip and later the vacuum is released to expel a specific amount of the liquid into a destination reservoir. Often a large number of measured samples of a liquid or liquids must be obtained and analyzed under a variety of conditions to satisfy the requirements of a laboratory test. Consequently, the task of pipetting liquid specimens to and from various test tubes and micro tubes can be a tedious and repetitive task. It is well understood that such tasks can be the cause of debilitating repetitive stress injuries, such as carpal tunnel syndrome. Repetitive stress injuries can affect the hands, wrists, elbows and other parts of the body when specific tasks are executed repeatedly and over multiple days such that the tasks are performed in a relatively stressful manner, due to a non-ergonomic work environment and also when the affected body parts are provided insufficient time to heal.

Numerous racks and holding assemblies for test tubes, micro tubes and micro plates have been developed to address a variety of handling, measurement and positioning requirements. U.S. Pat. No. 5,128,105, issued to Berthold on Jul. 7, 1992, relates to a rack system for a plurality of specimen containers used for transporting the specimen containers through a measurement instrument. U.S. Pat. No. 5,409,667, issued to Elson on Apr. 25, 1995, relates to a portable rack for medical or laboratory tubes where it is desirable that the tubes be supported in either generally vertical or horizontal positions, as the user desires. In particular, the portable rack is especially useful for maintaining a horizontal orientation of a viewing section of the tubes after centrifuging. U.S. Pat. No. 5,950,832, issued to Perlman on Sep. 14, 1999, relates to a specimen vial storage assembly which includes multiple specimen vials, a rigid support member and a flexible sheet storage device. The device is directed toward the storage of specimen vials such that accidental loss and mix-up of samples is minimized. U.S. Application No. 2001/0002986 A1, filed by Fattinger; et al. on Dec. 20, 2000, relates to a handling system for a multiplicity of chemical or biological compounds or samples adapted for high throughput screening of stored samples. In particular, a system for handling a multiplicity of tubes is disclosed in which a tube can be inserted and removed from a storage compartment located within a single piece frame. The apparatus is suitable for use with conventional robots used in high throughput screening to allow efficient means of storage and retrieval of individual samples.

While it is evident that the design of apparatus for handling laboratory test tubes, micro tubes and micro plates is an active field, fostering considerable development and innovation, the prior art does not address the need for an ergonomic pipetting environment, especially a pipetting environment which includes a configuration of different-sizes and types of test tubes or micro plates.

A typical work environment for pipetting consists of a plurality of racks for various test tubes containing liquid specimens as well as one or more micro plates arranged on a lab bench. A micro plate is a flat plate, usually made of polystyrene, which includes an array of wells used as small test tubes. Micro plates can also be designed to hold an array of small glass tube inserts. Each well within a micro plate typically holds from several microliters to several milliliters of liquid and can be formed in a variety of shapes. Further, a single micro plate may include an array of several to several hundred wells. As part of a laboratory test, a technician will typically move a plurality of measured samples of liquids to and from various beakers, tubes and micro tubes disposed on a lab bench. Since the racks of test tubes and micro plates are typically arranged and rest directly on the surface of a lab bench, few ergonomic adjustments are available to a lab technician when pipetting liquid samples. The lack of an optimized ergonomic pipetting work environment can contribute to the development of repetitive stress injuries and an increase in the possibility of errors in lab testing. It would therefore be beneficial to provide a pipetting environment that would allow for greater adjustment of the collective positioning and arrangement of the tubes and micro plates needed for pipetting, in order to reduce the occurrence of repetitive stress injures and the likelihood of pipetting errors.

DETAILED DESCRIPTION OF THE PREFERRED EMBODIMENT

Figure 1:
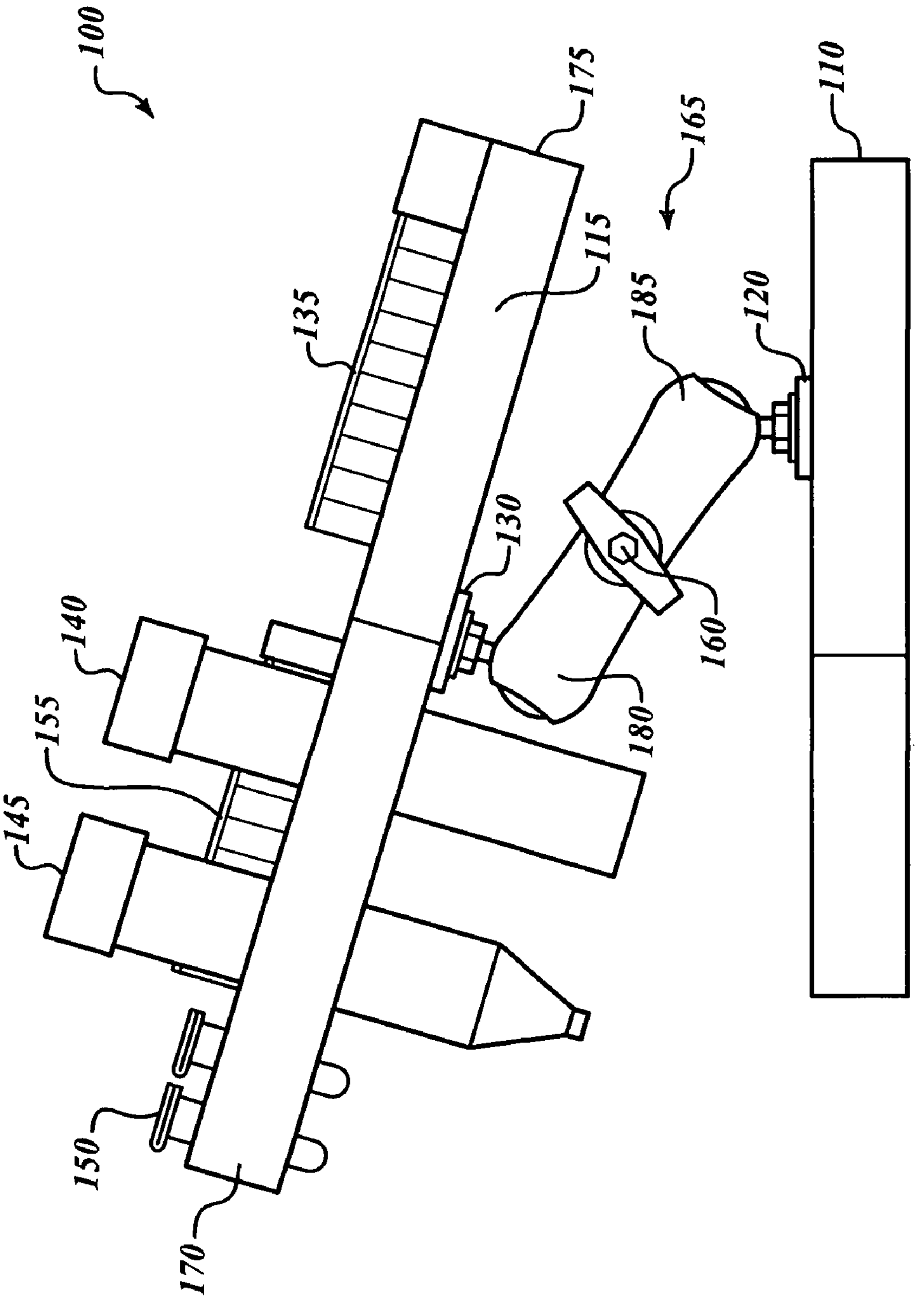
FIG. 1 is a side view of an exemplary embodiment of the present invention.

Referring to FIG. 1, an embodiment of the present invention is depicted from a side view. In FIG. 1, the ergonomic pipetting workstation (100) includes a support base (110), which operates as a base stand for the workstation and is designed to be placed on a relatively flat surface such as a laboratory workbench. In the embodiment illustrated in FIG. 1, the support base (110) is a bottom plate, which has a length, width and mass which is sufficient to provide the necessary stability for the pipetting workstation (100). Other embodiments of the present invention may include a single suction cup support base instead of a bottom plate. A suction cup may be used for the support base when it is necessary that a pipetting workstation adhere to a flat, nonporous work surface in a substantially fixed position. One example of an applicable suction cup support base is the RAMB-102U mount model manufactured by National Products Inc., Seattle, Wa. Preferably, the support base (110) shown in FIG.

1 includes a plurality of rubber feet or relatively small suction cups affixed to the bottom of the bottom plate to better stabilize the pipetting workstation (100), when in use. In FIG. 1 a coupling joint (165) includes a first connecting portion (120) which is affixed to the bottom plate (110) and a second connecting portion (130) which is affixed to the top plate (115). In one embodiment, the first and second connecting portions (120 and 130 respectively) are affixed to the top plate (115) and support base (110) using conventional screws, nuts and washers. As will be evident to one having ordinary skill in the art, other means to affix the connecting portions to the top and bottom plates can be employed in other embodiments of the invention. Some non-exhaustive examples of other affixing means are through the use of adhesives to affix said first connecting portion (120) to said support base (110) and said second connecting portion (130) to said top plate (115) or a configuration that allows the connecting portions to snap fit rigidly into said top plate (115) and support base (210).

In FIG. 1 the coupling joint (165) allows for overall vertical height and angle adjustment of the top plate (115) relative to the support base (110). In one embodiment, the coupling joint (165) includes at least two pivot points (180, 185) to provide the vertical adjustment of the top plate (115). The coupling joint (165) and first and second pivot points (180 and 185 respectively) also allow for a relative adjustment in height of the rear portion (170) of the top plate (115) compared with the front portion (175) of the top plate (115). In other words, the coupling joint (165) and first and second pivot points (180 and 185 respectively) allow for a rotation of the top plate (115) along an axis which is substantially parallel with the front and rear portions (175 and 170 respectively) of the top plate (115). In some embodiments, the first pivot point (180) of the coupling joint (165) allows for the rotation of the top plate (115) along two or more axes. Such embodiments allow for a comparatively wide and flexible range of planar angle adjustments of the top plate (115) compared with the support base (110). In the embodiment depicted in FIG. 1, the coupling joint (165) is a dual, ball joint mechanism that allows for height and planar angle adjustments of the top plate (115) compared with the support base (110) and for transversal adjustment between the top plate (115) and the support base (110) positions. In operation, the top plate (115) is moved into a desired orientation when the adjustment knob (160) is in a loosened position. With the top plate (115) maintained in the desired position, the adjustment knob (160) is turned until it reaches a substantially tightened position, after which the top plate (115) will remain fixed in the desired orientation. In some embodiments the coupling joint is similar or equivalent to the Universally Positionable Mounting Device described in U.S. Pat. No. 5,845,885, which is hereby incorporated by reference. It is anticipated that many other embodiments of a coupling joint (165) can be implemented and yet remain within the scope of the invention. For example, a plurality of single axis hinges can be used instead of ball joints for the coupling joint (165) with one or more adjustment knobs, to enable vertical and angular adjustments of the top plate relative to the support base.

Figure 2:
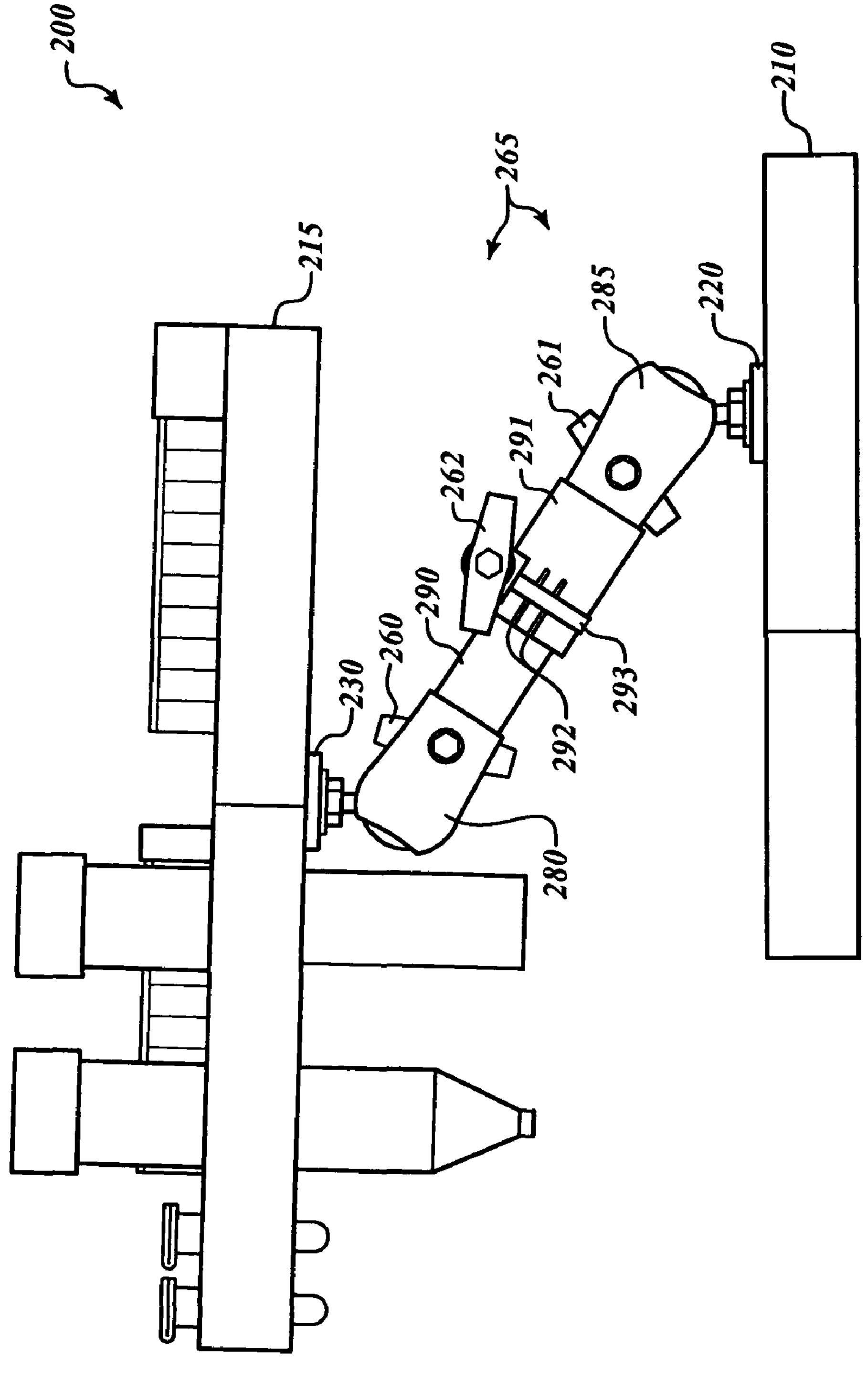
FIG. 2 is a side view of another exemplary embodiment of the present invention.

The pipetting workstation (200) in FIG. 2 illustrates a variation of a coupling joint (265), in which first and second telescoping sections (290 and 291 respectively) are located between first and second pivot points (280 and 285 respectively), embodied as ball joints. In FIG. 1, the first and second pivot points (180 and 185 respectively) are directly coupled together and tightened by one adjustment knob (160). In contrast, the workstation (200) in FIG. 2 includes a first pivot point (280) and a corresponding first adjustment knob (260) and a second pivot point (285) having a corresponding second adjustment knob (261), used to independently adjust and substantially fix the angular position of the corresponding first and second pivot points (280 and 285). The first telescoping section (290) has a portion which variably fits within the second telescoping section (291) thus providing a selectable adjustment in the length of the coupling joint (265). In one embodiment, the second telescoping section (291) includes one or more notches (292), which extend from and end configured to receive said portion of the first telescoping section (290). In FIG. 2, a band clamp (293) is positioned around the second telescoping portion (291) and across the notches (292). When the telescoping adjustment knob (262) is turned to a substantially loosened position, the band clamp (293) is released so that the depth in which the first telescoping section (290) is inserted into the second telescoping (291) section can be adjusted. When the telescoping adjustment knob (262) is rotated into a substantially tightened position, the perimeter of the second telescoping section (291) is constricted by the band clamp (293), thus gripping and fixing the position of the first telescoping section (290) within the second telescoping section (291). One having ordinary skill in the art will recognize that the coupling joint (265) can alternatively be arranged such that the ball joints are coupled together directly in series as in FIG. 1, with a single adjustment knob and either the first or the second telescoping section (290 and 291 respectively) is directly coupled to either the first or second connection portions (220 and 230 respectively). In such embodiments, only two adjustment knobs may be needed, compared with the three adjustment knobs (290, 291, and 292) used in the embodiment shown in FIG. 2. Still other embodiments may include a coupling joint, which includes a telescoping section in combination with only one pivot point having at least one axis of rotation. It is further anticipated that numerous, well known means to provide an adjustable, telescoping section within the coupling joint are readily applicable and within the scope of the present invention. With the added telescoping sections (290, 291), the coupling joint (265) provides for greater flexibility of the top plate (215) positioning by providing means which are independent of pivot point adjustments for height adjustment of the top plate (215), as compared with the workstation depicted in FIG. 1.

Figure 3:
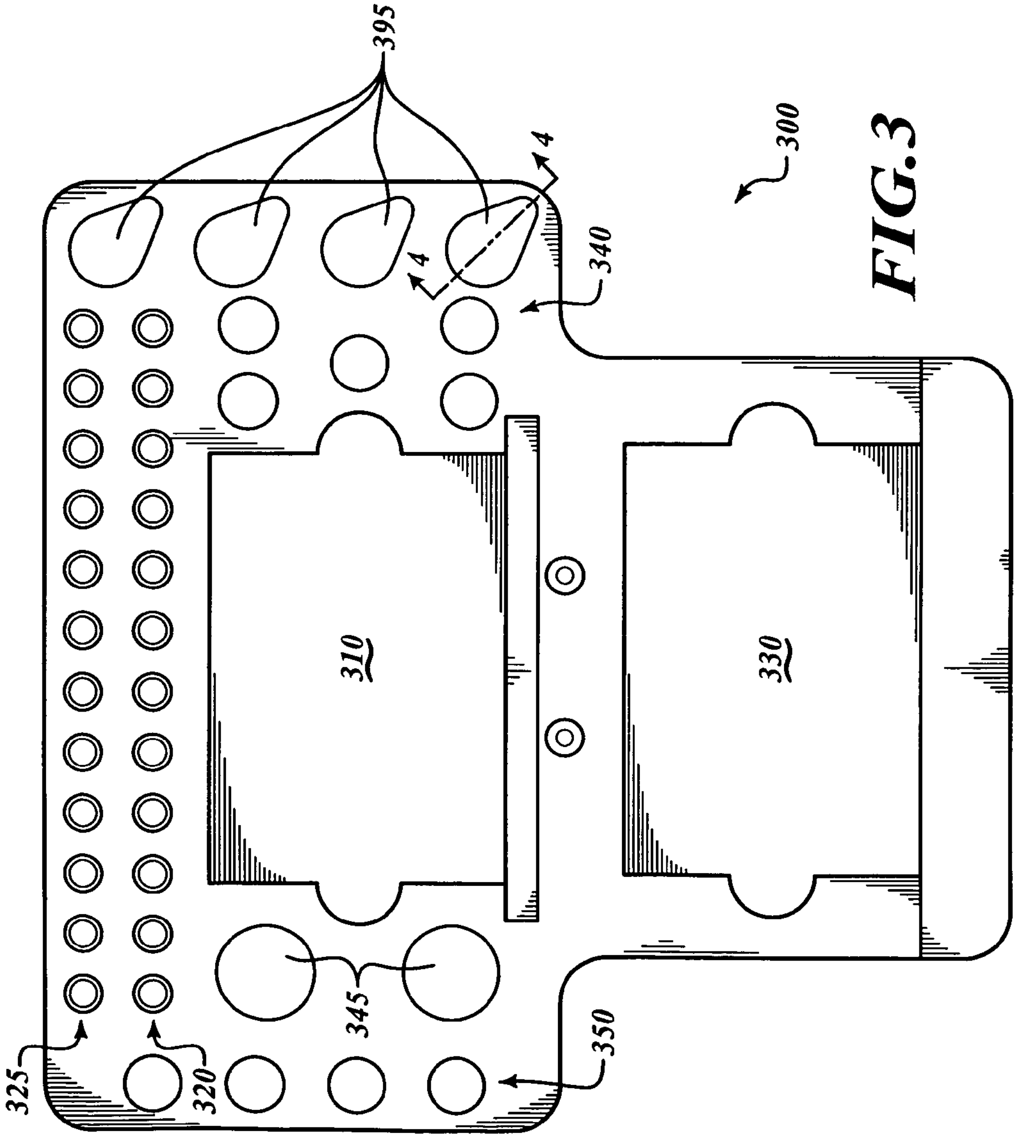
FIG. 3 is a top view of an exemplary embodiment of a top plate in accordance with the present invention.

Referring to FIG. 3, a top view perspective of a top plate (300) for the present invention is depicted. The top plate (300) includes first and second micro plate cavities (330 and 310 respectively), each having suitable depths and dimensions for the insertion of target micro plates. It is anticipated that one or a plurality of micro plate cavities can be included in the top plate (300) without departing from the scope of the present invention. Moreover, the depth and dimensions of particular micro plate cavities within a top plate configuration are best determined by the physical dimensions of micro plates intended for use with the top plate. As shown in FIG. 3, the dimensions of first and second interpolate cavities 330 and 310 respectively) are substantially equivalent, however the scope of the present invention is not so limited. The first and second micro plate cavities (330 and 310 respectively) further include access cutouts (315), which extend a portion of the micro plate cavities (330, 310) to allow easy placement and removal of micro plates to and from the micro plate cavities (330, 310), when a micro plate is held by its edges. In some embodiments, a high friction backing, such as a sheet of black neoprene rubber may be used to line the back of the micro plate cavities (330, 310) to grip and prevent movement of micro plates inserted into the micro plate cavities (330, 310) and to provide a contrasting background when inspecting clear liquid specimens contained in a micro plate.

The top plate (300) further includes a plurality of through-holes and sets of through holes (325, 320, 340, 345 and 350) for insertion of laboratory test tubes. The present invention is not limited for the use of any particular laboratory test tube type. Test tubes are made from a variety of materials and with relatively minor variations in overall shape although with significant variations in size, which distinguish them for various purposes, such as culture tubes, cryobiology tubes, micro tubes, transport tubes and centrifuge tubes. Centrifuge tubes for example, typically but not always have a conical-shaped bottom portion. For the purposes of this disclosure the term “test tube” is used to refer to all types of laboratory tubes that have a generally tubular shape, which are applicable to the present invention, such as centrifuge tubes, micro centrifuge tubes other tube types. Preferably, a plurality of through holes are provided within the top plate with a variety of hole diameters to simultaneously accommodate test tubes having different diameters on the same top plate. For the example top plate (300) depicted in FIG. 3, four through holes (350) are provided on the leftmost side of the top plate (300) sized to accommodate 10 ml test tubes and two through holes (345) are provided to the immediate right of the four through holes (350), sized to accommodate two 50 ml centrifuge tubes. Also depicted in the example top plate (300) of FIG. 3 are five through holes (340) sized for the insertion of 15 ml test tubes. Finally, above the second micro plate cavity (310) are two rows of twelve through holes (320 and 325), which are sized to accept 1.5 ml test tubes. The two rows of twelve through holes (320 and 325) are also shown having conical openings or profiles to better fit test tubes, which substantially fit into the through holes (320 and 325) but have slightly different diameters. Through holes with conical profiles are also used to better fit some test tubes that have labels taped to them in order to identify a specimen. As shown, the top plate embodiment illustrated in FIG. 3, provides a work platform in which substantially all of the needed reservoirs, tubes and micro plates for a given pipetting task can be collectively arranged on the top plate (300) and then optimally and ergonomically positioned in a pipetting workstation as desired by a scientist or lab technician. It will be obvious to one having ordinary skill in the art that other configurations of through holes for test tubes or micro plate cavities or pipette holders or combinations of these features may be optimally designed within scope of the present invention for almost any particular pipetting task.

Figure 4:
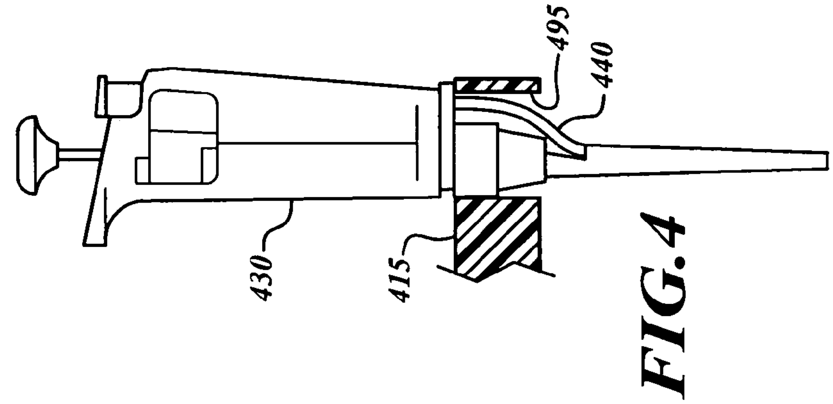
FIG. 4 is a cutaway view of a pipette inserted into a pipette holder in a top plate, in accordance with the present invention.

Optionally included in the top plate embodiment shown in FIG. 3 is a plurality of pipette holders (395), each of which comprise an appropriately-sized, circular hole having an added corner or nook cutout, to accept commonly used pipette devices, such as a Pipetman pipeter manufactured by Gilson, Inc. FIG. 4 illustrates a cutaway view of a pipette (430) inserted into a pipette holder (395). As shown in FIG. 4 the pipette (430) incorporates a tip ejector (440), so that a scientist or technician can remove disposable pipette tips after use, without touching the used tips. When the pipette (430) is placed into a pipette holder, the tip ejector (440), which extends into the pipettor tip area of the pipette, will fit into the triangular nook of the pipette holder (495).

Figure 5:
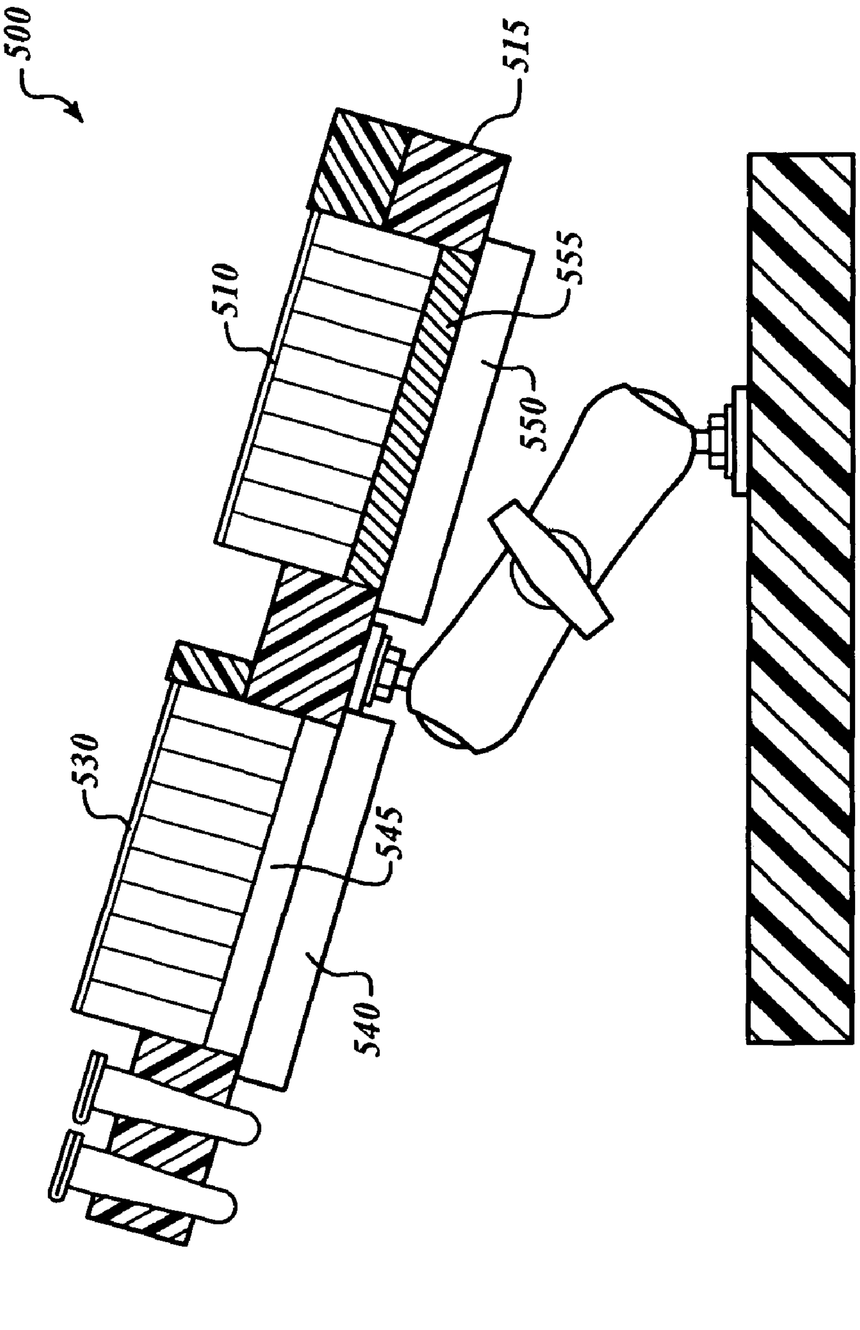
FIG. 5. is a cutaway view of an exemplary embodiment of the present invention, which includes micro plate cavity back lighting and temperature control.

Some embodiments of the present invention may include features of the micro plate cavities to allow a scientist or lab technician to more easily view specimens in a micro plate or to temperature control micro plate specimens. The drawing of FIG. 5 depicts a cutaway view of the present invention, in which first and second micro plate cavities (510 and 530 respectively, shown with installed micro plates) are further adapted for the purpose of optional micro plate back lighting or micro plate temperature control. In FIG. 5, the first micro plate cavity (510) includes a heat conductive bottom section (555), which has a particular thermal conductivity and forms the bottom of the first micro plate cavity (510). An electronic heating and cooling device (550), such as a Peltier device, as well as necessary control electronics components, are affixed to the bottom side of the top plate (515), directly underneath the first micro plate cavity (510). In some embodiments, the conductive bottom section (555) comprises a relatively thin layer of the same material as the top plate (515) itself. In other embodiments, the conductive bottom section (555) comprises a material, which has a relatively high thermal conductivity, such as metal or ceramic. In operation, an electronic temperature probe, located within the first micro plate cavity (510) and electronic control circuitry operate to continuously bias the electronic heating and cooling device (550) to establish and maintain the micro plate cavity at a particular, desired temperature. The availability and use of such electronic controls and electronic temperature probes are well known in the art. The second micro plate cavity (530) includes an optical plate (545) made of plastic or glass, which may be either transparent or translucent and optionally colored. The optical plate (545) forms the back of the second micro plate cavity (530). A back light unit (540) is affixed to the bottom side of the top plate (515), directly underneath the second micro plate cavity (530). The back light unit (540) may comprise fluorescent tube sources or LED arrays, as well as necessary lighting electronics, well known in the art, to provide white or colored light as needed. With the back light unit (540) activated, light is transmitted through the optical plate (545) to the second micro plate cavity (530), so that liquid specimens contained in a micro plate placed in the micro plate cavity (530) can be easily viewed by a laboratory technician. The back lighting of the a micro plate is useful in colony picking for example, a common laboratory procedure in which colonies of bacteria, yeast strains, etc, are identified according to size, shape, color and other attributes, in order to select the best or particular samples.

As described, the pipetting workstation provides an improved ergonomic environment for pipetting of liquids to and from laboratory test tubes and micro plates. In general, this is accomplished by providing a common surface designed to hold a plurality of test tubes of various sizes or one or more micro plates incorporating an array of micro tubes or combination thereof. The common surface or top plate is fully adjustable with respect to height and planar angle to enable a laboratory technician to comfortably position substantially all of the receptacles and reservoirs needed for a pipetting effort. The ergonomic flexibility of the disclosed pipetting workstation alleviates the need to adopt stressful positions when pipetting, thus minimizing the likelihood of repetitive stress injuries.

While the preceding description of the present invention has grouped certain through holes and micro plate cavities according to a common size, one having ordinary skill in the art will recognize that many other combinations, sizes or groupings are possible. Numerous modifications, changes, variations, substitutions, and equivalents will occur to those skilled in the art without departing from the spirit and scope of the present invention as defined by the appended claims.

The embodiments of the invention in which an exclusive property or privilege is claimed are defined as follows:

1. A pipetting workstation comprising:

a top plate with at least one micro plate cavity with access cutouts to allow easy placement and removal of micro plates to and from the at least one micro plate cavity;

a bottom plate;

a coupling joint with first and second connecting portions to provide vertical and angular adjustments of the top plate relative to the bottom plate, the first connecting portion affixed to said bottom plate, the second connecting portion affixed to said top plate, the coupling joint having first and second ball joints, each ball joint having 2 axis of rotation and first and second adjustment knobs to selectively fix the position and to select a particular planar angle of the top plate relative to the bottom plate;

first and second telescoping sections positioned in between said first and second ball joints and a telescoping adjustment knob to adjust and fix the length of the coupling joint; and an optical plate used to form a back in the at least one micro plate cavity and a back light unit affixed to a bottom side of said top plate to provide light through the optical plate into the at least one micro plate cavity.

2. A pipetting workstation as in claim 1 wherein the back light unit comprises an LED array.

3. A pipetting workstation as in claim 2 wherein the optical plate is translucent.

* * * * *